United States Patent

[11] 3,594,675

[72] Inventor James R. Willson
 Garden Grove, Calif.
[21] Appl. No. 828,629
[22] Filed May 28, 1969
[45] Patented July 20, 1971
[73] Assignee Robertshaw Controls Company
 Richmond, Va.

[54] TEMPERATURE-SENSING PROBE
 9 Claims, 7 Drawing Figs.
[52] U.S. Cl. .................................................. 337/140,
 73/378.3, 116/101, 337/395
[51] Int. Cl. ..................................................H01h 37/50,
 G01k 5/48
[50] Field of Search........................................... 73/378.3;
 337/395, 394, 140; 116/114.5, 101

[56] References Cited
UNITED STATES PATENTS
| | | | |
|---|---|---|---|
| 2,083,317 | 6/1937 | Dallenbach.................. | 337/395 |
| 2,559,372 | 7/1951 | Rike............................. | 337/394 |
| 3,403,238 | 9/1968 | Buehler........................ | 73/378.3 |
| 3,483,752 | 12/1969 | Rogen.......................... | 73/362.8 |

Primary Examiner—Louis R. Prince
Assistant Examiner—Denis E. Corr
Attorneys—Auzville Jackson, Jr., Robert L. Marben and Anthony A. O'Brien ABSTRACT: A temperature-sensing probe in the form of a rod or wire body is made from an alloy composition exhibiting a characteristic of mechanical shape memory as a result of martensitic-type transformation. Such body is possessed with a shape memory upon which a selected controlled shape has been previously impressed and is deformable at temperatures below a selected shape memory transition temperature. It is capable of doing work while returning to such selected control shape at the selected shape memory transition temperature from a deformed shape. There is a control device upon which it performs such work.

PATENTED JUL 20 1971 3,594,675
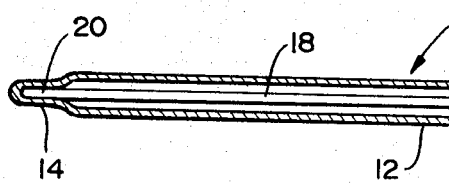
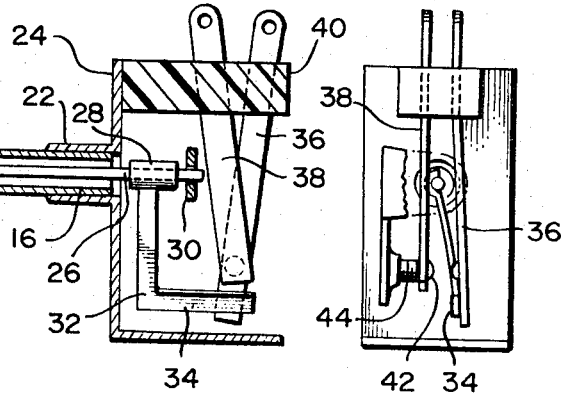
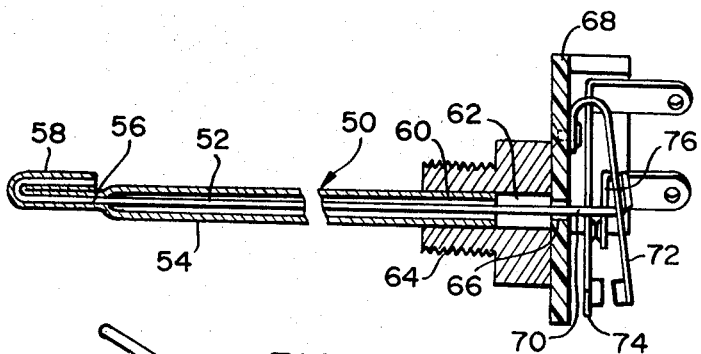
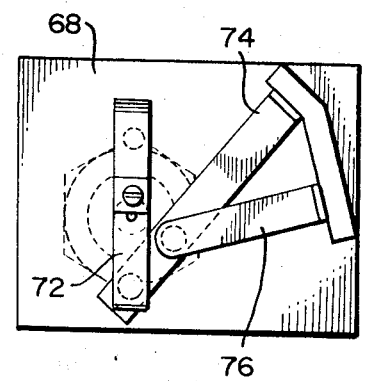
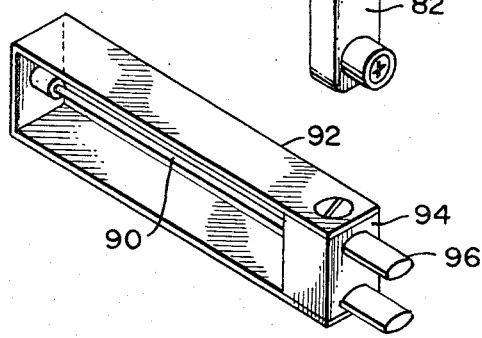
INVENTOR,
James R. Willson
Anthony A. O'Brien
ATTORNEY 3,594,675

TEMPERATURE-SENSING PROBE

BACKGROUND OF THE INVENTION

1. Field of the Invention

This invention generally appertains to improvements in temperature-sensing devices and, more particularly, relates to new and novel improvements in temperature-sensing probes which have numerous applications in temperature prevalent environment for the purpose of reacting to temperature fluctuations and performing work in response to predetermined high temperature conditions in connection with the actuation of control means in the form of thermostats, temperature-warning devices, switch mechanisms, and valve or other operating means.

2. Description of Prior Art

Temperature-sensing devices, especially of the probe type, are well known in many fields of industrial endeavor, for example, a temperature operated switch actuator, a thermostatic switch, a temperature indicator and a thermally responsive actuator, to mention but a few.

The conventional probe-type temperature-sensing devices include a bimetal device, usually having a coiled form; a rod and tube with the rod being of a material having a coefficient of thermal expansion substantially lesser than that of the encasing tube, for example, the tube being formed from copper and the rod being an Invar rod; a hydraulic expansion element; and, a vapor pressure element.

The bimetallic devices have linear movement so that they must be calibrated carefully in the operating device and such devices do not possess self-limiting movement and, in addition, in many applications, a bimetal device, in order to be properly sensitive to temperature changes, must be rather large, usually in a relatively large coil form, necessitating the occupation of more space than is desirable.

Known rod-and-tube devices also have linear movement so that they must be calibrated carefully in an operating device and the movement and work capability of known rod-and-tube devices is rather limited in relation to the volume of material per degree of temperature change. Furthermore, known rod-and-tube devices depend upon the expansion characteristics of the encasing outer tube so that, therefore, the outer tube must be designed with the movement characteristics primarily in mind. Also, known rod-and-tube devices are not limited in their reaction to over-temperature conditions, which is also a drawback attendant with bimetal devices.

Hydraulic expansion elements, as known in temperature control or temperature-reactive work mechanisms, are rather costly and are subject to failure caused by very small leaks. In addition, hydraulic expansion elements are not limited in their reactive movements to a given top temperature.

Known vapor pressure elements are also subject to failure caused by minute leaks and are limited in their operation because of the characteristics of known vapor charge fluids to certain set top operating temperatures.

From the foregoing, it can be appreciated that there is a great need in ever-increasing control systems where temperature-sensing devices are so important for a new probe-type temperature-sensing device which is not subject to the drawbacks associated with the above-known types of mechanical, probe-type temperature-sensing means, and which has numerous advantages over such known types of temperature-sensing devices.

SUMMARY OF THE INVENTION

Accordingly, an object of the present invention is to construct a temperature-sensing probe which will eliminate the structure and operational disadvantages associated with conventional temperature-sensing probes.

Another object of this invention is to cold-draw a rod or wire body made of an alloy having a shaped memory and then annealing area of the body which serves as a temperature-sensing device.

The present invention has a further object in that a temperature-sensing probe is made of an alloy having shaped memory with portions of the probe being cold drawn to define supporting means and with another portion being annealed to function as a temperature sensor.

The present invention is characterized in that a temperature-sensing probe includes a wirelike body formed of an alloy having a shape memory with a preselected control shape being previously impressed on the body and subsequently being deformed below a transition temperature so that the body will perform work while returning from its deformed shape to its preselected control shape, a support for the wire body, a control device actuated by the wire body on its return to its preselected control shape and means for deforming the body into a deformed shape.

BRIEF DESCRIPTION OF THE DRAWING

FIG. 1 is a longitudinal sectional view of a temperature-sensing probe including a twisted shape memory rod or wire to which is attached a torsionally activated temperature control device.

FIG. 2 is a front elevation of the temperature-sensing probe of FIG. 1.

FIG. 3 is a longitudinal sectional view of a temperature-sensing probe including a selectively stretched shape memory rod or wire.

FIG. 4 is a front elevation of the sensing probe of FIG. 3.

FIG. 5 is a perspective view of a temperature-sensing probe formed in accordance with the present invention and including a shape memory wire which controls an operating valve that can be used in a pneumatic control circuit.

FIG. 6 is a perspective view of a temperature-sensing device for environments where extreme sensitivity is desired and where protection for the shape memory rod or wire is not necessary.

FIG. 7 is a perspective view of a temperature probe for a temperature-indicating device of the warning type.

DESCRIPTION OF THE PREFERRED EMBODIMENTS

The illustrated embodiments of the present invention are directed to a temperature-sensing probe composed of a wire or rod body formed from an alloy composition exhibiting the unusual characteristic of mechanical shape memory as a result of martensitic-type transformation. An example of such alloy composition is the recently discovered nickel-titanium alloy which has many advantages over bimetallic composites, one being that it produces more useful work per unit weight of metal. Such nickel-titanium alloy preferably has 50 to 70 percent nickel content by weight and from about 50 to 30 percent titanium by weight with the alloy having the structure of a TiNi phase in combination with a TiNi$_3$ phase dispersed in a TiNi matrix within a temperature range of about 500° C. to about −75° C. A preferred composition for such an alloy is 55 percent nickel by weight with the remainder being essentially titanium.

While the foregoing specifically defined nickel-titanium alloy has been found to be of inestimable value in the present invention because it exhibits the unusual characteristic of possessing a temperature-actuated mechanical memory, the present invention finds its value in utilizing other materials with a temperature-actuated mechanical shape memory even though they may not be of such particularly delineated nickel-titanium composition.

The most important aspect of the materials employed resides in the unusual characteristic of shape or mechanical memory. By this is meant that a straight wire of a material can be bent or contorted below its transition temperature and it will retain its formed shape, but when the deformed wire is heated above its transition temperature with nothing constraining its free movement, such wire will immediately spring back to its original straight shape.

An engineering description of such material in its transition is to say that it has a curve of increasing modulus with increasing temperature and another curve of decreasing modulus with decreasing temperature. This description applies to either modulus of elasticity or to modulus in torsion.

In general, such material is used in a complete cycle, that is, the control or work mechanism applies a load to the memory material that will cause the material to deform when it is cold and, to complete the cycle, heat is supplied from a medium being controlled or supplied from a power source to cause the material to perform work. The supplied heat causes the material to try to return to the annealed shape it had before it was deformed. The mechanisms for applying load and heat to the material should be such that they allow the material to go through complete cycles with an excess of work available for control or work functions, with no loss of dimensional stability.

In comparison with bimetal temperature-sensing probes, the present invention possesses numerous advantages, those summarized briefly in the following:

1. The probe of the present invention has a minimum of 30 times the work capability of bimetal per unit volume material, per degree temperature change. This makes it possible to use a much smaller amount of the shape memory material than bimetal for the same job. The smaller amount of the shape memory material makes the probe of the invention much more sensitive to temperature changes.
2. A shape memory material rod or wire can be deflected through its length so that a probe of this material can be as thin as the wire diameter plus clearance, plus the tubing walls. A bimetal device for the same application would have to have a coiled form that would occupy much more space and thus add to the cost and size of the part.
3. The materials of the present probe (such as the nickel-titanium alloys) have the potential of withstanding much higher operating temperatures than present bimetal devices. Also, the probes can be bent without affecting performance.
4. When properly used, the shape memory material develops most of its movement through a small range of temperature so that calibration is built into the material. Bimetal devices have linear movement so they must be calibrated carefully in the operating device. Also, such shape memory material is limited, i.e., it stops moving at a given top temperature to prevent overstressing of parts with over-temperature conditions.

When compared with temperature-sensing rod-and-tube devices, the probe of the present invention also has many desirable advantages, such as the following:

1. When the probe of the present invention is used in a flame safety device, where the device closes the switch with heat, the shape memory material provides a safe-failure mode. In this type of device, the material is stressed when closing the switch so that an overstressing of the material or a breakage of the material will allow the switch to open and fail-safe.
2. When used properly, the material develops most of its movement through a small range of temperature so that calibration is built into the material. Rod-and-tube devices have linear movement so they must be calibrated carefully in an operating device.
3. Also, the present probe has many times the movement and work capability of a rod-and-tube device for the same volume of material per degree temperature change, and it does not depend on the expansion characteristics of its outer tube; therefore, the outer tube can be designed to develop optimum characteristics other than movement. These characteristics could be corrosion resistance, strength, or others.
4. The memory shape material is limited, i.e., it stops moving at a given top temperature to prevent overstressing of parts with overtemperature conditions.

In comparison with hydraulic expansion elements, used as temperature-sensing means, the probe of the present invention also has numerous advantages. In this respect, the probe of the present invention is less costly and more easily made to have a safe-failure mode. Furthermore, it is not subject to failure caused by any leaks and it does not require ambient compensation at the switch. In addition, the probes of the present invention have the potential of having much higher operating temperatures than hydraulic fluids. Also, the probe of the present invention is limited in that it stops moving at a given top temperature to prevent overstressing of parts with over-temperature conditions.

Compared to vapor pressure elements used as temperature-sensing means, the probes of the present invention are far less costly and are not subject to failure caused by minute leaks of fluid.

In the embodiment illustrated in FIGS. 1 and 2, the temperature-sensing probe 10 is composed of an elongated tubular support housing or sheathing 12 having a closed end 14 and an opposing open end 16. An elongated wire or rod body 18, formed from an alloy composition as specified in the summary hereof or from any composition that exhibits the unusual characteristic of mechanical shape memory as a result of martensitic-type transformation, is coaxially disposed within the tubular housing and has an outer end portion 20, that is left in its cold-drawn state and not annealed like the remaining portion of the body, fitted in the closed end 14 of the housing, such end 14 being crimped so as to secure the end portion 20 in place. Any other anchoring means for the end portion 20 may be utilized, such as swagging, welding or any method that will secure the wire 18 and not allow it to move axially relative to the encasing tubular housing or support 12. The tubular housing 12 has an opposing open end portion 16 fitted within a socket or holding sleeve 22 provided on a supporting plate or reference means 24.

The opposing end portion 26 of the wire or rod 18 protrudes through a suitable opening in the plate 24 and is supportingly held in a support bearing 30.

An L-shaped operating arm 32 has a curved upper end 28 attached to the protruding end portion 26 of the wire body 18, and a lateral lower end portion 34 of arm 32 engages a lower end of a contact arm 36. The contact arm 36 is movable while a companion contact arm 38 is stationary, and contact arms 36 and 38 are supported by a mounting block 40 that is suitably anchored to the plate 24. The contact arms are supported such that electrical contacts carried thereby are normally in contact engagement, and contact arm 36 is made of a strip of spring material such that it can be bent to open the contacts, as illustrated in FIG. 2.

The temperature-sensing probe 10 operates by means of torsion, because the wire 18 has been previously annealed to the selected strain configuration. This configuration, having been impressed upon the shape memory, remains unless removed by a subsequent annealing operation.

The spring force from contact arm 36 easily deforms the wire when it is below its transition temperature and is consequently extremely malleable so that the contact arm 36 is forced into contact engagement with the stationary arm 38 at the electrical contact point 42. Obviously, the reversed annealing and torsioning operation would be just as feasible depending upon selected use in a normally closed or normally open position. For instance, contact arm 36 may be supported in block 40 such that it is spaced from contact point 42 when the temperature sensed by wire 18 is below the transition temperature, and end portion 34 of operating arm 32 may be disposed so as to engage the opposite side of contact arm 36. Thus, when the temperature increases above the transition temperature wire 18 will cause operating arm 32 to move contact arm 36 into contact engagement with contact point 42.

The operating arm 32 is loaded by means of the spring force from contact arm 36 so that the wire rod 18 below its transition temperature will be deflected in torsion causing a rotation of the operating arm 32. In this cold position, the operating arm 32 will be rotated so that the movable contact arm 36 is allowed to come in contact with the stationary contact arm 38. When the wire or rod 18 is heated above its transition temperature, it will try to return to its annealed, undeflected state. In doing this, the wire or rod 18 will overcome the return spring force from contact arm 36 and will rotate in a direction that will cause the operating arm 32 to separate the movable contact arm 36 from the stationary contact arm 38. Thus, it may be seen that wire 18 returns to its annealed control shape to open the contacts when the temperature is above the transition temperature, and when the temperature drops below the transition temperature the spring force from contact arm 36 places wire 18 in a deformed shape to permit closure of the electrical contacts.

An adjustment 44 can be used, if desired, to locate the position of the stationary contact arm 38 which bears thereagainst, as shown in FIG. 2.

Electrical isolation can be obtained in the device by adding an insulating base between the operating arm 32 and the movable contact arm 36.

In FIGS. 3 and 4, the temperature-sensing probe 50 includes a piece of wire or fine rod 42 formed from a material, that exhibits the unusual characteristic of mechanical shape memory as a result of martensitic-type transformation, such as the delineated nickel-titanium composition. The wire body 52 is disposed inside of and securely fastened to an encasing metallic tube 54. The outer end portions 56 and 58 of the rod 52 and tubing 54, respectively, are bent over on each other, as shown in FIG. 3, whereby the rod 52 is anchored to the outer closed end 58 of the support tubing 54.

The tubing 54 has an opposing open end portion 60 which is socketed within a bore 62 formed in a housing and mounting piece 64, which is of the type that can be rigidly fastened in a water heater. The wire rod body 52 protrudes beyond the open end portion 60 of the support tubing and passes through a suitable opening 66 formed in the base 68 of the housing and mounting piece. The protruding end portion 70 of the rod or wire bears against a movable operating arm 72 which is carried by the base 68 in association with a movable contact arm 74 and a companion stationary contact arm 76.

The operating arm 72 exerts a force against the wire or rod 52 in an axial direction. Other spring means may be added to supplement the force of the operating arm 72, if found necessary.

When the wire or rod body 52 is below its transition temperature, the force of the operating arm 72 will cause the wire or rod 52 to elongate so that the operating arm 72 moves away from the movable contact arm 74 allowing that arm to complete an electrical contact with the stationary contact arm 76.

Heating the wire or rod 52 above its transition temperature will cause the material to return to the position it had before it was elongated by force of the operating arm 72 and, in returning to its original position, the wire or rod 52 will move the operating arm 72 and the movable contact arm 74, thereby causing a separation between the movable contact arm 74 and the stationary contact arm 76, which results in an interruption of the electrical circuit. Thus, it may be seen that wire 52 returns to its shortened annealed control shape to open the contacts when the temperature is above the transition temperature, and when the temperature drops below the transition temperature wire 52 will be placed in the elongated deformed shape by the force from operating arm 72 to close the contacts.

The probes 10 and 50, as shown in FIGS. 1 and 3, respectively, are merely exemplary of types of temperature-sensing probes in accordance with the present invention. Obviously, the present invention is not confined to the normally closed switches shown in connection with such probes since the switches can be normally open or normally closed or double throw. Other operating devices can also be employed with probes, such as shown in FIGS. 5—7.

In FIG. 5, the sheathed or housed memory shape wire rod (not shown) of the probe 80 is operative to actuate the operating valve (not shown) that can be employed in a pneumatic control circuit and which is mounted within the pneumatic control block 82 having an inlet and an outlet.

In FIG. 6, the wire or rod body 90 is mounted within the framelike support housing 92 so that the wire body 90 is exposed where extreme sensitivity is desired and protection for the wire or rod 90 is not necessary. The rod 90 is exposed for maximum sensitivity and response to its environment. The operator block 94 of the arrangement of FIG. 6 can be a switch or any other control means. Depending upon the switch device within the operator block 94, the wire body 90 can operate in torsion, by stretching, by unbending, by twisting or by any other method of returning to whatever shape has been impressed upon its shape memory. Typically, whatever control signal results therefrom may be fed through the signal outlet 96 to any control circuit.

FIG. 7 shows an indicator 100 that could be used with a probe 102 formed in accordance with the present invention. This arrangement would be used by loading the wire or rod of the probe in torsion so that when the wire is heated, it will cause the indicating plate 104 to rotate, allowing the color or indicating portion 106 on the surface of the plate to show through a windowlike opening 108 in a plate 110, thus giving a warning that the transition temperature has been reached.

Various other applications for probes formed and utilized in accordance with this invention will obviously occur to those skilled in the art. For example, a probe could be used as a flame sensor for a burner which probe, when heated above its transition temperature, would close a set of contacts thereby signalling the presence of the flame and allowing a valve or other operating means to operate and admit gas to the main burner. Such arrangement would require a rod or wire with a transition temperature that is high enough to indicate the flame separate and apart from the environmental temperature of the device. Thus, the wire or rod would be enclosed or encased within an outer tubular housing or sheathing that would be of a high temperature material that could resist the effects of the pilot burner flame.

A probe in accordance with the present invention could also be made in a long section with the section then being bent on a radius so that the bent probe could be used in the windings of a motor for operating a switch to act as a motor protection device.

A probe, in accordance with the present invention, could also be used to sense temperature in a contained fluid so as to control the temperature of the contained fluid. In such arrangement, the probe support tubing would be selected to give maximum response to the corrosive effects of the controlled fluid since it is not necessary to select the support tubing for its temperature expansion characteristic, as in the case of conventional rod and tube temperature-sensing probes.

Inasmuch as the present invention is subject to many variations, modifications and changes in detail, it is intended that all matter contained in the foregoing description or shown in the accompanying drawing shall be interpreted as illustrative and not in a limiting sense.

What I claim is:

1. A temperature-sensing probe comprising
    a straight wire body adapted to be exposed to temperatures to be sensed and being made of a material having a temperature-actuated shape memory;
    a support means for said wire body;
    said wire body having a straight preselected control shape and being deformable to a longer straight deformed shape when temperatures below a predetermined transition temperature are sensed and returning to said control shape as a result of said temperature-actuated shape memory when temperatures above said transition temperature are sensed;
    deformation means mounted on said support means and engaging said wire body to apply a stretching force along the longitudinal axis of said wire body to bring the same to its deformed shape; and control means actuated in response to said wire body assuming said control and deformed shapes in accordance with the sensed temperatures.

2. The invention of claim 1 wherein said support means includes a tubular housing encasing said wire body and having a closed end and an open end, and said wire body has a first end fixedly anchored at said closed end of said housing and a second end connected with said deformation means, said control means being actuated by movement of said second end of said wire body.

3. The invention of claim 2 wherein said control means includes an electrical switch having a stationary contact arm and a movable contact arm, and said deformation means includes an operating arm attached to said second end of said wire body and operative to move said movable contact arm away from said stationary contact arm when said wire body assumes said control shape.

4. A temperature-sensing probe comprising
a wire body adapted to be exposed to temperatures to be sensed and having a first end portion and a second end portion and being made of a material having a temperature-actuated shape memory;
support means for said wire body including means fixedly anchoring said first end portion of said wire body;
said wire body having a preselected control shape and being deformable to a deformed shape when temperatures below a predetermined transition temperature are sensed and returning to said control shape as a result of said temperature-actuated shape memory when temperatures above said transition temperature are sensed; and
control means engaging said second end portion of said wire body including deformation means mechanically biasing said wire body to automatically place said wire body in said deformed shape when temperatures below said transition temperature are sensed, said control means having a first state when said wire body assumes said control shape and having a second state when said wire body assumes said deformed shape.

5. The invention of claim 4 wherein said wire body is straight in said deformed and control shapes, and said deformation means twists said wire body about the longitudinal axis.

6. The invention of claim 4 wherein said control means includes an electrical switch having a stationary contact, a movable contact and an operating arm attached to said second end portion of said wire body, and said deformation means includes a movable arm carrying said movable contact and engaging said operating arm to apply a twisting force to said wire body.

7. The invention of claim 4 wherein the support means includes a tubular housing encasing said wire body and having a closed end anchoring said first end portion of said wire body and an open end through which said wire body extends to said second end portion.

8. The invention as recited in claim 4 wherein said material is an alloy of nickel and titanium.

9. The invention as recited in claim 8 wherein said alloy has a composition of 55 percent nickel by weight with the remainder being essentially titanium.